United States Patent [19]

Konishi et al.

[11] Patent Number: 5,410,011
[45] Date of Patent: Apr. 25, 1995

[54] ONE-COMPONENT POLYURETHANE TYPE ADHESIVE, AND USE THEREOF

[75] Inventors: Shin Konishi, Fujisawa; Shinji Hirayama, Hadano; Takao Hidai, Anjo; Yukihiro Morikawa; Koichi Uehara, both of Yokohama; Sadako Hashimoto, Hadano, all of Japan

[73] Assignees: Inoac Corp.; Nippon Polyurethane Industry Co., Ltd.

[21] Appl. No.: 109,099

[22] Filed: Aug. 19, 1993

[30] Foreign Application Priority Data

Dec. 4, 1992 [JP] Japan .................. 4-350249

[51] Int. Cl.$^6$ ............................. G08G 18/79
[52] U.S. Cl. ........................ 528/73; 528/45; 528/67; 528/905
[58] Field of Search ............. 528/73, 45, 67, 905

[56] References Cited

U.S. PATENT DOCUMENTS

| | | | |
|---|---|---|---|
| 4,044,171 | 8/1977 | Muller et al. | 427/27 |
| 4,430,474 | 2/1984 | Schnurbusch et al. | 524/590 |
| 4,442,280 | 4/1984 | Grogler et al. | 528/54 |
| 4,463,154 | 7/1984 | Disteldorf et al. | 528/45 |
| 4,520,186 | 5/1985 | Hess et al. | 528/73 |
| 4,801,663 | 1/1989 | Ueyanagi et al. | 525/528 |
| 5,143,994 | 9/1992 | Laas et al. | 528/45 |

FOREIGN PATENT DOCUMENTS 0122913 7/1983 Japan.
2-620 1/1990 Japan.

*Primary Examiner*—John Kight, III
*Assistant Examiner*—R. F. Johnson
*Attorney, Agent, or Firm*—Davis Hoxie Faithfull & Hapgood

[57] ABSTRACT

A one-component type polyurethane adhesive: comprising, as a main component, a polyurethane precursor prepared by reaction of a polyisocyanate component (a) containing one or more polyisocyanate compounds (a-1) mention below and optionally one or more polyisocyanates (a-2) mention below with an active hydrogen compound (b) having a molecular weight of from 18 to 20,000 and having two or more active hydrogen groups in the molecule, at an equivalent ratio of the active hydrogen group of the active hydrogen compound component (b) to the isocyanate group of the polyisocyanate component (a) of more than 1.0; the polyurethane precursor containing a uretdione group and the active hydrogen group at an equivalent ratio of the uretdione group to the active hydrogen groups of from 0.25 to 1.0, (a-1): a polyisocyanate compound having at least a uretdione group in the molecule thereof, and (a-2): a polyisocyanate having two or more isocyanate groups in the molecule thereof.

18 Claims, No Drawings

ONE-COMPONENT POLYURETHANE TYPE ADHESIVE, AND USE THEREOF

BACKGROUND OF THE INVENTION

1. Field of the Invention

The present invention relates to a one-component type polyurethane adhesive, more particularly, to a one-component type polyurethane adhesive which comprises a polyurethane precursor as a main component having uretdione groups and active hydrogen groups at a prescribed ratio and which cures by chain extension and crosslinking on simple heating without evolution of a free polyisocyanate monomer, and is excellent in operability and safety, and the use thereof.

2. Related Background Art

Polyurethane type adhesives used for general purpose are mostly of solvent types from the standpoint of ease of operation.

Polyurethane adhesives are roughly classified into the following three classes according to the curing mechanism.

The first class of the adhesives are two-component type polyurethane adhesives, in which a first component of a polyisocyanate and/or an isocyanate-terminated prepolymer with a second component of a low-molecular-weight polyol and/or urethane-modified polyol having molecular weight of less than 10,000, and are mixed immediately before application, and applied to a base material (adherend) to be cured.

The second class of the adhesives are moisture-curing type polyurethane adhesives, which contain an isocyanate-terminated prepolymer and cure by reaction with active hydrogen groups of a base material or moisture in the air. This group includes non-solvent type reactive hot-melt adhesives which are melted at a temperature of 100° C. or higher, applied to a base material and cooled to solidify to exhibit initial adhesive force, and later react with active hydrogens on the base material or moisture in air to be cured by polymerization and crosslinking.

The third class of adhesives are one-can lacquer type polyurethane adhesives, which are a solution or dispersion of a high-molecular-weight thermoplastic polyurethane resin in a solvent or water, and the solution is applied to a base material. The high-molecular-weight polyurethane resin having high cohesive energy forms adhesive layer to exhibit adhesive force by simple evaporation of the solvent or the water.

The respective classes of adhesives have advantages and disadvantages as described below.

The two-component type polyurethane adhesive forms an adhesive layer which has generally a crosslinked structure and is superior in heat-resistance and durability. However, its pot life is limited because the liquid formulation of the two components becomes viscous due to the reaction of the isocyanate group with the hydroxy group in the system, and gels finally.

The moisture-curing type polyurethane adhesive forms an adhesive layer which gives final adhesive force weaker than a two-component type polyurethane adhesive but are superior in heat resistance and other properties. Since the adhesive force is usually caused by the reaction with moisture on the base material or in air, the adhesive has disadvantages that the reaction proceeds slowly and the initial adhesive force is exhibited slowly, and the adhesiveness depends on external conditions such as low temperature and low humidity in winter, and high temperature and high humidity in summer.

The above two classes of adhesives, namely the two-component type polyurethane adhesives and the moisture-curing type polyurethane adhesives, contain a free polyisocyanate monomer in a slight amount in the system. The free polyisocyanate monomer tends to aggravate working environment depending on the conditions of application of the adhesive, and frequently necessitates local ventilation. The one-can lacquer type polyurethane adhesive, which is a solution of high-molecular-weight polyurethane resin such as a thermoplastic polyurethane solution, has a semipermanent pot life unless the solvent is not evaporated, and is easily handled. This type of adhesive, however, forms an adhesive layer which has thermoplasticity and a low melting point due to no crosslinked structure, and therefore the heat-resistance is low since the adhesion strength thereof falls at a temperature exceeding the softening temperature.

Many proposals have been presented regarding improvement of polyurethane adhesives. For example, regarding the one component lacquer type polyurethane adhesives, a proposal is presented that a polyisocyanate curing agent is added thereto (two-pack type). Regarding the two component type polyurethane adhesive, a composition of a blocked isocyanate is proposed which is seemingly a one component system and comprises an isocyanate curing agent blocked with a blocking agent that generates isocyanate groups by dissociation and evaporation of the blocking agent in heating higher than 120° C. and a low-molecular-weight polyol and/or a urethane-modified polyol. Use of this composition still involves problems of adhesive layer foaming caused by the blocking agent, pollution caused by evaporation of the blocking agent, drop of adhesive force resulting from residual blocking agent, and so forth. Therefore, this composition is rarely used for adhesives, although it is used as a one-pack paint system in some of paint application fields. Regarding moisture-curing type polyurethane adhesive, there is proposed a formulation which is less affected by external conditions as the results of incorporation of a hygroscopic composition or a catalyst; a seemingly one component system which contains a curing agent such as kerimine compound (Schiff base) and aldimine compound to generate an amino group in contact with moisture, and an isocyanate-terminated prepolymer system; and so forth. No complete one component type adhesive has not been obtained which is storable for a long time. Therefore, the development thereof is strongly demanded at the moment.

Furthermore, from the global environmental problems, VOC (Volatile Organic Compound) regulation is being tightened, and movements toward resource conservation, non-pollution, and higher safety are required in the fields of paints, adhesives, and inks. In view of the decreasing pollution, adhesives and paints of high-solid type, powder coating type, water-borne type, and hot-melt type are attracting attention. At present, however, any high-solid type or non-solvent type polyurethane adhesive for general purpose has not been developed which satisfy both the ease of handling and the excellent characteristics of the solvent type polyurethane adhesive containing a large amount of a solvent. Therefore, the development thereof is strongly demanded. Moreover, development of a polyurethane adhesive which satisfies the VOC regulation and contains no free isocyanate monomer is strongly demanded.

On the other hand, uretdione group-containing polyurethane resins are already known (See: Kunststoffhandbuch, Volum VII, pages 17 to 37 (1966). It is also known that a uretdione group-containing compound opens the uretdione group which is a dimer of isocyanate group to regenerate two isocyanate groups (J. H. Saunders, K. C. Frisch: Polyurethanes, Chemistry and technology, Part 1, p. 113 (1962), Interscience Publishers).

Further, uretdione group-containing polyisocyanate compounds and related application techniques are known as shown in U.S. Pat. Nos. 4,044,171, 4,430,474, 4,442,280 and 4,801,663; and Japanese Patent Application Laid-open No. Hei-2-620; and so forth. The techniques relating to toluene diisocyanate dimer have long been known in the field of powder coating and millable rubber hardeners. Uretdione group-containing polyurethane resins of isophorone diisocyanate type and diphenylmethane diisocyanate type have come to be known recently.

The features of the novel polyurethane adhesive of the present invention to meet the above demands are: (1) sufficient adhesiveness to various base materials and excellent film properties owing to high cohesive energy characteristic of conventional polyurethane adhesives, (2) ease of handling in coating and spraying owing to low viscosity which is achieved by two-component type polyurethane adhesives, (3) excellent heat-resistance and excellent durability owing to crosslinking formed by reaction at the time of adhesion, (4) semipermanent storage stability and long pot life which are achievable by lacquer type adhesives and blocked isocyanate systems, (5) no liberation or no evaporation of free polyisocyanate monomer during formulation and heating, and reduction of the amount of a solvent to meet the VOC regulation for environment protection, and (6) high-solid type, non-solvent type, or solid type of adhesive.

SUMMARY OF THE INVENTION

The present invention intends to provide a one-component type polyurethane adhesive which has the features of (1) high adhesiveness to base materials and excellent film properties, (2) low viscosity and resulting superiority of handling in coating, spraying, and other processes, (3) excellent heat-resistance and durability owing to crosslinked structure, (4) semipermanent storage stability and pot life, (5) no liberation or no evaporation of free polyisocyanate during operation and (6) the possibility of development of not only high solid type but also of non-solvent type, and solid type.

The one-component type polyurethane adhesive according to the present invention comprises, as a main component, a polyurethane precursor prepared by reaction of a polyisocyanate component (a) containing one or more polyisocyanate compounds (a-1) mentioned below and optionally one or more polyisocyanates (a-2) mentioned below with an active hydrogen compound (b) having a molecular weight of from 18 to 20,000 and having two or more active hydrogen groups in the molecule, at an equivalent ratio of the active hydrogen group of the active hydrogen compound component (b) to the isocyanate group of the polyisocyanate component (a) of more than 1.0; the polyurethane precursor containing a uretdione group and the active hydrogen groups at an equivalent ratio of the uretdione group to the active hydrogen group of from 0.25 to 1.0; (a-1): a polyisocyanate compound having at least a uretdione group in the molecule thereof; and (a-2): a polyisocyanate having two or more isocyanate groups in the molecule thereof.

The aforementioned polyisocyanate compound (a-1) is preferably the one which has a uretdione group, and an isocyanurate group, and if desired, another group derived from an isocyanate group.

Another embodiment of the one-component type polyurethane adhesive according to the present invention contains further another active hydrogen compound having a molecular weight of from 18 to 20,000 and having two or more active hydrogens in the molecule additionally in such an amount that the equivalent ratio of the uretdione group to the total of the active hydrogen groups of the polyurethane precursor and the active hydrogen groups of the additional active hydrogen compound is in the range of from 0.25 to 1.0.

In practical use the adhesive of the present invention, the one-component type polyurethane adhesive is applied to an adherend at a temperature lower than the dissociation temperature of the uretdione group and then heated to a temperature higher than the dissociation temperature to cause reaction and curing, or otherwise the one-component type polyurethane adhesive is heated to a temperature higher than the dissociation temperature of the uretdione and then applied to an adherend to cause reaction and curing.

BRIEF DESCRIPTION OF THE PREFERRED EMBODIMENT

The present invention provides a one-component type polyurethane adhesive, which comprises a polyurethane precursor as a main component containing uretdione groups and active hydrogen groups at a prescribed ratio.

The polyisocyanate compound (a-1) in the polyisocyanate component (a) has at least a uretdione group in the molecule, and, if necessary, may have an isocyanurate group and further a group which is derived from an isocyanate group and is different from the above two groups (uretone-imine group and isocyanurate group). This group which is derived from an isocyanate group and is different from a uretdione group and an isocyanurate group includes a urethane group, a carbodiimide group, a uretone-imine group, oxazolidone group, a hydantoin group and the like. One or more kinds of the polyisocyanate compound (a-1) may be used. For example, the polyisocyanate compound (a-1) may be a mixture of a polyisocyanate compound having a uretdione group and another polyisocyanate compound having both a uretdione group and an isocyanurate compound.

The polyisocyanate compound (a-2) in the polyisocyanate component (a) has two or more isocyanate groups in the molecule. The polyisocyanate compound (a-2) may be a combination of two or more thereof.

The polyisocyanate for forming the aforementioned polyisocyanate compound (a-1), or a polyisocyanate (a-2) includes not only free polyisocyanate monomers but polymeric forms thereof.

The polyisocyanate monomer specifically includes aromatic diisocyanates such as known 2,4-tolylene diisocyanate (hereinafter referred to as "TDI"), 2,6-tolylene diisocyanate, xylene-1,4-diisocyanate, xylene-1,3-diisocyanate, 4,4'-diphenylmethane diisocyanate (hereinafter referred to as "MDI"), 4,4'-diphenyl ether diisocyanate, 2-nitrodiphenyl-4,4'-diisocyanate, 2,2'- diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, etc.; aliphatic diisocyanates such as tetramethylene diisocyanate, hexamethylene diisocyanate, (hereinafter referred to as "HDI"), lysine diisocyanate, etc.; alicyclic diisocyanates such as isophorone diisocyanate, hydrogenated tolylene diisocyanate, hydrogenated xylene diisocyanate, hydrogenated diphenylmethane diisocyanate, tetramethylxylene diisocyanate, etc.; and polymeric forms of the above diisocyanates; and polyisocyanates derived by reaction of the above diisocyanate or the polymeric form thereof with a two- or more-functional polyol. Thus, polymeric forms of polyisocyanates and polyol adducts of polyisocyanates are all useful in the present invention.

The polyisocyanate compound (a-1) which is the essential component in the present invention, such as a polyisocyanate compound having a uretdione group and a polyisocyanate compound having a uretdione group and an isocyanurate group, is produced generally through a dimerization reaction (uretdione-forming reaction), a trimerization reaction (isocyanurate-forming reaction), or the like reaction. Specifically, it is produced by the following manner.

A reaction can be carried out by the way that a corresponding polyisocyanate monomer is reacted in the presence of a known uretdione-forming catalyst at a temperature of usually from 0° to 90° C. in the absence or presence of an inert solvent conventionally used in polyurethane industry, sometimes in a polyol or plasticizer like DOP. The known uretdione-forming catalyst includes trialkylphosphines such as triethylphosphine, dibutylethylphosphine, tri-n-propylphosphine, triamylphosphine, and tribenzylphosphine; pyridine, and the like. The inert solvents includes aromatic solvent such as toluene, and xylene; ketone type solvents such as methyl ethyl ketone, and methyl isobutyl ketone; ester type solvents such as ethyl acetate, and butyl acetate; and glycol ether ester type solvents such as propylene glycol methyl ether acetate, and ethyl-3-ethoxypropionate.

At the time when 20 to 50 mol % of the isocyanate group in the reactant has been reacted, the uretdione-forming reaction is stopped by inactivating the uretdione catalyst by addition of a solution of an inactivating agent such as phosphoric acid, methyl p-toluenesulfonate, and sulfur into the reaction solution. Some kinds of polyisocyanates deposit as a crystal form during the reaction. In particular, aromatic polyisocyanates generally crystallize and separate from the reaction system. In such a method, a mixture is formed which contains a polyisocyanate compound having a uretdione group (namely, a dimer and a polyuretdione), another polyisocyanate compound having a uretdione group and an isocyanurate group, and a starting polyisocyanate monomer. The intended mixture of a polyisocyanate compound having a uretdione group and another polyisocyanate compound having a uretdione group and an isocyanurate group is obtained by eliminating the starting polyisocyanate monomer from the reaction mixture by the thin film distillation or the like method. The formation ratio of the isocyanurate group is higher at the higher reaction temperature and at the lower content of the polyisocyanate monomer at the reaction termination. Further, the formation ratio of the uretdione group is higher at the larger amount of the catalyst such as triethylphosphine. A polyisocyanate compound having the uretdione group and the isocyanurate group in a desired ratio can be prepared by controlling such reaction conditions.

In the inventions disclosed in U.S. Pat. Nos. 4,430,474, 4,463,154, and 4,442,280, Japanese Patent Publication No. 2-16332, even when only a pure dimer of polyisocyanate or a polymeric form thereof is contained, the contents of the polymer of dimer are controlled below a certain level, and in particular, in order to avoid gelation in the production of a polyurethane precursor, the isocyanurate structure which gives branched structure is minimized.

On the contrary, positive introduction of an isocyanurate group in addition to the uretdione group as in the polyisocyanate component (a) of the present invention enables high-solid formulation in comparison with conventional one-component type polyurethane adhesives, and gives higher heat resistance and higher durability.

In the case where the polyisocyanate compound contains a certain ratio of an isocyanurate group and/or another polymer in addition to the uretdione group in the molecule, the isocyanurate group enables introduction of branch sites in such a level that the polyurethane precursor does not gel. Accordingly, it was found that the adhesive of the present invention gives excellent properties, in a practical heat-curing step, in a shorter time and lower reaction ratio by dissociation reaction at a temperature of uretdione dissociation temperature of one-component type polyurethane adhesives and subsequent reaction with an active hydrogen group in comparison with known adhesives derived from a polyurethane compound having a uretdione group.

The polyisocyanate compounds (a-1) and (a-2) containing unreacted polyisocyanate monomer may be used as the polyisocyanate component (a) such as, the main component, of the adhesive of the present invention without separation of unreacted polyisocyanate monomer in some cases. It is preferable in some cases that unreacted polyisocyanate monomer is eliminated from the polyisocyanate compound containing a uretdione group and isocyanurate group, and another polyisocyanate monomer is mixed thereto to lower the number of functional groups of the polyisocyanate component (a) and to control the reactivity of the polyisocyanate component (a) and the properties of the product and that the component (a) thus obtained is reacted with an active hydrogen compound component (b) to avoid the problem of gelation in polyurethane precursor production. The polyisocyanate monomer for the preparation of a uretdione group and the polyisocyanate monomer to be further added may be the same or different.

The active hydrogen compound component (b) in the present invention has a molecular weight of from 18 to 20,000, and has two or more active hydrogen groups in the molecule. Specifically the component (b) is preferably selected from water, polyols, polyamines having an amino group, urea resins, melamine resins, epoxy resins, polyester resins, acrylic resins, polyvinyl alcohols, and the like, and may be a combination of two or more thereof.

The polyol includes known polyols in polyurethane industry. The polyol is preferably of a low functional number such as two-functional ones in order to prevent gelation in polyurethane precursor production because the polyisocyanate component (a) is two- or more-functional. The examples of the polyol include polyesterpolyols, polyesteramidepolyols, polyetherpolyols, polyether-esterpolyols, polycarbonatepolyols, and so forth. Specifically, the polyesterpolyols and polyesterpolyamidepolyols are prepared by the condensation reaction of a dicarboxylic acid or an acid ester or an acid anhydride thereof solely or in mixture with a glycol, a diamine or triamine, or an aminoalcohol solely or in mixture. The dicarboxylic acid includes succinic acid, adipic acid (hereinafter referred to as AA), sebacic acid, azelaic acid, terephthalic acid (TP), isophthalic acid (IP), hexahydroterephthalic acid, and hexahydroisophthalic acid. The glycol includes ethylene glycol 1,3-propylene glycol, 1,2-propylene glycol (1,2-PG), 1,4-butylene glycol (1,4-BG), 1,5-pentaneglycol, 1,6-hexane glycol (1,6-HG), 3-methyl-1,5-pentane glycol, neopentyl glycol, 1,8-octane glycol, 1,9-nonanediol, diethylene glycol, cyclohexane-1,4-diol, cyclohexane-1,4-dimethanol, dimer acid diols, trimethylolpropane (TMP), glycerin, hexanetriol, and ethylene oxide adducts or propylene oxide adducts of Quadrol or bisphenol A. The diamine includes hexamethylenediamine, xylenediamine, and isophoronediamine. The aminoalcohol includes monoethanolamine, and isopropanoltriamine. The polyesterpolyol further includes lactone type polyesterpolyols which are derived by ring-opening polymerization of a cyclic ester (i.e., lactone) monomer such as $\epsilon$-caprolactone, alkyl-substituted $\epsilon$-caprolactones, $\delta$-valerolactone, and alkyl-substituted $\delta$-valerolactones. The polyetherpolyol includes polyethylene glycol, polypropylene etherpolyol, and polytetramethylene etherpolyol. The polyetheresterpolyol includes polyesterpolyols prepared by the reaction of the aforementioned polyetherpolyol with the aforementioned dicarboxylic acid, acid anhydride, or the like. The polycarbonatepolyol includes the ones prepared by the reaction of hexane glycol, 3-methyl-1,5-pentanediol, or 1,4-cyclohexanedimethanol with diethyl carbonate, or diphenyl carbonate: specific example thereof is N-980, and N-981 made by Nippon Polyurethane Industry Co., Ltd. Further, as the polyol in the present invention, also useful are the monomeric diols and triols mentioned above as the starting material of the polyesterpolyol; namely, ethylene glycol, 1,3-propylene glycol, 1,2-PG, 1,4-BG, 1,5-pentane glycol, 1,6-HG, 3-methyl-1,5-pentane glycol, neopentyl glycol, 1,8-octane glycol, 1,9-nonanediol, diethylene glycol, cyclohexane-1,4-diol, cyclohexane-1,4-dimethanol, dimer acid diols, TMP, glycerin, hexanetriol, and ethylene oxide adducts or propylene oxide adducts of Quadrol or bisphenol A.

The polyamine having an amino group includes monomeric diamines, triamines, aromatic amines, and polyetherpolyamines which are polyethers having amino groups as the terminal groups.

Urea resins, melamine resins, epoxy resins, polyester resins, acrylic resins, polyvinyl alcohols, and so forth are those known in polyurethane industry, and are useful as the whole or a part of the active hydrogen compound component (b) provided that the substance has two or more active hydrogen groups in the molecule.

The active hydrogen compound component (b) has preferably a molecular weight in the range of from 18 to 20,000, more preferably is water or has a molecular weight of from 400 to 10,000. The excessively high molecular weight thereof decreases the amount of introduction of uretdione groups, isocyanate groups, urethane groups, or the like, thereby lower the toughness or the cohesive force of the polyurethane resin, while extremely low molecular weight is liable to cause brittleness of the polyurethane resin, disadvantageously. Therefore, the molecular weight must be suitably selected depending on the use thereof. For the purpose of raising heat resistance and cohesive force of the adhesive, lower molecular weight of the component (b) is preferred.

The production process of the polyurethane precursor is described in detail below.

The polyurethane precursor is prepared by reacting the polyisocyanate component (a) with the active hydrogen compound (b) at an equivalent ratio of the active hydrogen group in the compound (b) to the isocyanate group in the component (a) is more than 1.0, namely in excess of the active hydrogen group. The polyurethane precursor contains the uretdione group and the active hydrogen group in a uretdione/active hydrogen equivalent ratio of from 0.25 to 1.0. The abovementioned excess of the active hydrogen group is required to prepare a polyurethane precursor which contains an active hydrogen groups without leaving residual isocyanate groups. Practicably, the average functional group number of the polyisocyanate component (a) resulting from the content of isocyanurate groups, etc, the average functional group number of the active hydrogen compound (b) resulting from the introduction of triol, etc. and the ratio of NCO/OH are selected so as not to cause gelation in the preparation of polyurethane precursor. The starting materials should be formulated so as to satisfy the conditions. It is important that the reaction is carried out at a temperature lower than the uretdione group opening temperature. The formulation ratio is selected according to the gelation theory of J. P. Flory, Khun, et al. Actually, however, the polyurethane precursor is prepared without gelation by reacting the components (a) and (b) at the blending ratio selected in consideration of the reactivity ratio of the reactive groups in the components (a) and (b).

The polyurethane precursor can be prepared by mixing the components uniformly in the aforementioned formulation ratio and reacting the components at a temperature where the uretdione group does not cause ring opening, preferably not higher than 100° C. in a molten state, in a bulk state, or in a solution in an inert solvent conventionally used in polyurethane industry. The inert solvent includes aromatic hydrocarbons such as toluene, and xylene; esters such as ethyl acetate, and butyl acetate; ketones such as methyl ethyl ketone, and cyclohexanone; glycoletheresters such as ethylene glycol ethyl ether acetate, propylene glycol methyl ether acetate, and ethyl-3-ethoxy propionate; ethers such as tetrahydrofuran, and dioxane, polar solvents such as dimethylformamide, dimethylacetone, N-methylpyrrolidone, and furfural; and mixture of two or more thereof. The reaction apparatus for the above reaction may be of any type provided that the above homogeneous reaction can be conducted. Examples thereof are a reaction vessel provided with a stirrer, and a mixing-blending apparatus such as kneaders, and single-screw or multiple-screw extruders. A metal catalyst such as dibutyltin dilaurate, or tertiary amine catalyst such as triethylamine conventionally used in polyurethane industry may be added to accelerate the reaction.

The polyurethane precursor prepared as above may have, based on polyisocyanate compound (a-1) to be used in addition, to the uretdione group and the active hydrogen group, further an isocyanurate group, a urethane group, a carbodiimide group, a uretonimine group, an oxazolidone group, hydantoin group or the like which is derivable from an isocyanate group. The polyurethane precursor is required to have no isocyanate group substantially, and have a uretdione group and an active hydrogen group at a uretdione/active-hydrogen ratio of from 0.25 to 1.0, preferably from 0.35 to 0.75. This equivalent ratio is required on ring-opening of uretdione by heating, etc. If the uretdione group is in excess relative to the active hydrogen group, the adhesive of the present invention is capable of reacting with water in the environment to cause crosslinking or chain extension, reacting with a urethane group or a urea group to form allophanate, or biuret, or polymerizing by the isocyanate group solely, e.g., to form a carbodiimide, an isocyanurate, etc. to cause chain extension and/or crosslinking. If the active hydrogen is in excess, a thermoplastic high polymer resin is obtainable.

The formulation and the use of the one-component type polyurethane adhesive of the present invention is described below.

To the aforementioned one-component type polyurethane adhesive composed mainly of the polyurethane precursor, another active hydrogen compound may be added in such an amount that the equivalent ratio of the uretdione group in the precursor to the total of the hydrogen groups in the precursor and the additional active hydrogen compound (uretdione/active hydrogen ratio) is in the range of from 0.25 to 1.0, preferably from 0.35 to 0.75. The active hydrogen compound to be additionally added includes the abovementioned polyols, amino-group-having polyamine, urea resins, melamine resins, epoxy resins, polyester resins, acrylic resins, and polyvinyl alcohols, and mixtures of two or more thereof. If the equivalent ratio of the uretdione group to the total active hydrogen groups in the one-component type polyurethane adhesive is in the range of from 0.5 to 1.0 with excess of the uretdione group, the adhesive of the present invention is capable of crosslinking and/or extending chain by the reaction with water in the environment, by the reaction with a urethane group or a urea group to form allophanate, or biuret, or by the polymerization of the isocyanate group sole, e.g., to form a carbodiimide, an isocyanurate, etc. On the contrary, if the equivalent ratio of the uretdione group to the total active hydrogen groups is in the range of from 0.25 to 0.5 with excess of the active hydrogen groups, a thermoplastic high polymer resin is prepared.

The adhesive of the present invention forms a polyurethane resin by thermal ring-opening of the uretdione group therein and subsequent reaction thereof with an active hydrogen group for chain extension and/or crosslinking, and finally giving excellent properties in adhesion, coating, and working. The uretdione groups in the adhesive of the present invention need not be entirely opened in the cases where sufficient adhesive properties are exhibited even in the presence of remaining uretdione groups.

The polyurethane precursor described above may be liquid, solid or powdery at an ordinary temperature. The precursor is worked up to an adhesive by addition of necessary additives in order to improve the adhesive performances. The additives include a dissociation catalyst for lowering the ring-opening temperature of the uretdione group, a gelation-preventing agent such as ester-urethane exchange reaction-preventing agent for preventing gelation during storage, an antioxidant, an ultraviolet absorber, a hydrolysis inhibitor, a colorant, a flame-retardant, a viscosity modifier, a flow modifier, a plasticizer, a thixotropic agent, a filler, and the like. The adhesive prepared thus of the present invention may be liquid, solid, or powdery in an ordinary state, and may be applied or scattered in a method suitable for the shape and the properties of the base material (adherend) to be bonded and the adhesion conditions. For example, the adhesive may be heated after the application, or otherwise may be heated before the application. A preferable method is chosen. In any case, the temperature and the time of the heating should be sufficient to cause the opening of the uretdione group, thereby a polyurethane resin being formed by chain extension and/or crosslinking to exhibit adhesive force finally.

The one-component type polyurethane adhesive of the present invention has characteristics as below.

Firstly, the adhesive has neither a free polyisocyanate monomer nor an isocyanate group at ordinary temperature. The uretdione group therein regenerates two isocyanate groups on heating above a temperature for causing ring-opening the uretdione group. The isocyanate groups regenerated by ring-opening of the uretdione group in the polyurethane precursor is unexceptionally bonded at the end of the polyurethane precursor molecule, which causes no evolution or evaporation of pollution-causing free polyisocyanate monomer. Therefore the adhesive of the present invention is handled safely in working environment. The adhesive undergoes chain extension and/or crosslinking by reaction of the regenerated isocyanate group with the terminal active hydrogen group (polyurethane prepolymer) as if the two-component polyurethane type adhesive, thereby exhibiting excellent adhesiveness which cannot be obtained with generally known one-component type adhesives including those of other type of resins. The adhesive of the present invention is not limited, below a certain temperature, in pot life being the disadvantage of the two-component type adhesives.

Secondly, The adhesive of the present invention has excellent wettability to a base material (adherend) which is ascribable to the lowering of molecular weight thereof on heating owing to ring opening of the uretdione group, and resulting lowering of the surface tension and melt viscosity.

Thirdly, the adhesive of the present invention relaxes the internal stress generated in the adhesive layer in adhesion process such as press-bonding.

Fourthly, the adhesive of the present invention can be designed to be well balanced in high cohesive energy characteristic of the polyurethane adhesive, the crosslinked structure initially present in the molecule, and the crosslinked structure formed by chain extension and/or crosslinking reaction on heating so as to meet the base material (adherend) and the adhesion conditions. Thereby, generation of the internal stress and defects which adversely affect the adhesion force can be decreased.

These characteristics come from the unique composition of the adhesive of the present invention.

In the one-component type polyurethane adhesive of the present invention, the uretdione group is opened on heating to decrease its molecular weight, and subsequently the molecular weight is increased by chain extension and/or crosslinking. In general adhesives, the molecular weight is constant from the initial stage to the final stage, or increases without decreasing. Therefore, the adhesive of the present invention exhibits peculiar curing behaviors. That is, in a certain period during heating, the viscosity of the adhesive temporarily decreases owing to the ring opening of the uretdione group, whereby the adhesive wets the base material (adherend) and spread thereon extremely rapidly and exhibits stress relaxation, and the characteristics as the adhesive is greatly improved. The present invention is accomplished with the findings above.

The present invention is described in more detail with reference to examples without limiting the invention in any way.

In Examples below, the terms "parts" and "%" are based on weight.

[Synthesis of Polyisocyanate Compound having at Least One Uretdione Group]

REFERENCE SYNTHESIS EXAMPLE 1

In a reactor equipped with a stirrer, a thermometer, and a cooler, there were placed 3,000 parts of HDI (made by Nippon Polyurethane Industry Co., Ltd., isocyanate group content: 49.9%, solid content: 100%), and 6.0 parts of trioctylphosphine as the catalyst. The contents in the reactor were heated to a temperature of from 65° to 70° C. with stirring, and were allowed to react at that temperature for 6 hours. Thereto, 3.5 parts of phosphoric acid was added to stop the reaction to obtain a pale yellow reaction solution having an isocyanate group content of 30.3%. Therefrom, unreacted HDI was removed by the thin film distillation at 120° C. at 0.01 Torr.

The resulting product had isocyanate groups at a content of 18.7%, and was confirmed to have isocyanate groups, uretdione groups, and isocyanurate groups by FT-IR and $C^{13}$-NMR. The isocyanate group content determined by reaction with dibutylamine (hereinafter referred to as DBA) in propylene glycol methyl ether acetate (a high-boiling solvent, hereinafter referred to as PGM-Ac) at its boiling point and subsequent back titration with aqueous hydrochloric acid was 30.8%. Accordingly, the isocyanate formed by dissociation of uretdione was 12.1%. The isocyanurate group content was 19.2%.

This compound which has a uretdione group and an isocyanurate group is hereinafter referred to as "Polyisocyanate A".

REFERENCE SYNTHESIS EXAMPLE 2

In a reactor equipped with a stirrer, a thermometer, and a cooler, there were placed and mixed 700 parts of TDI (Coronate ® T-80, made by Nippon Polyurethane Industry Co., Ltd., isocyanate group content: 48.1%, solid content: 100%), and 2,300 parts of toluene. Thereto 10.0 parts of tri-n-butylphosphine as the catalyst was added at 25° C. Thereby, the reaction started immediately. About 5 minutes later, the dimer began to separate at the bottom of the reactor. The contents in the reactor were kept at a temperature of from 50° to 65° C. with stirring, and were allowed to react at that temperature for 1.5 hours. Then, 2.5 parts of phosphoric acid was added to stop the reaction to obtain a pale yellow reaction solution having an isocyanate group content of 15.0%. Therefrom, the toluene and the unreacted TDI were removed roughly by simple distillation, and then by the thin film distillation at 120° C. at 0.01 Torr.

The resulting product had isocyanate groups at a content of 14.8%, and was confirmed to have isocyanate groups, uretdione groups, and isocyanurate groups by FT-IR and $C^{13}$-NMR. The isocyanate group content determined by reaction with DBA in PGM-Ac at its boiling point and subsequent back titration with aqueous hydrochloric acid was 36.1%. Accordingly, the isocyanate formed by dissociation of uretdione was 21.3%. The isocyanurate group content was 11.9%.

This compound which contains a uretdione group and an isocyanurate group is hereinafter referred to as "Polyisocyanate B".

REFERENCE SYNTHESIS EXAMPLE 3

In a reactor equipped with a stirrer, a thermometer, and a cooler, there were placed 3,000 parts of HDI (made by Nippon Polyurethane Industry Co., Ltd., isocyanate group content: 49.9%, solid content: 100%), and 45 parts of 1,2-PG. The contents in the reactor were allowed to react at 60° C. with stirring for 2 hours. The isocyanate group content came to 47.6%. Thereto, 6.5 parts of trioctylphosphine was added as the catalyst, and the reaction was allowed to proceed with stirring at a temperature of from 50° to 55° C. for 8 hours. Then 1.9 parts of phosphoric acid was added to stop the reaction to obtain a pale yellow reaction solution having an isocyanate group content of 40.2%. Therefrom, the unreacted HDI was removed by the thin film distillation at 120° C. at 0.01 Torr.

The resulting product had isocyanate groups at a content of 21.6%, and was confirmed to have an isocyanate group, a uretdione group, and an isocyanurate group by FT-IR and $C^{13}$-NMR. The isocyanate group content determined by reaction with DBA in PGM-Ac at its boiling point and subsequent back titration with aqueous hydrochloric acid was 38.5%. Accordingly, the isocyanate formed by dissociation of uretdione was 16.9%. The isocyanurate group content was 8.4%, and the urethane group content was 1.6%.

This compound which has a uretdione group and an isocyanurate group is hereinafter referred to as "Polyisocyanate C".

[Synthesis of Polyurethane Precursor]

SYNTHESIS EXAMPLE 1

In a reactor equipped with a stirrer, a thermometer, and a cooler, there were placed 100 parts of polyisocyanate A (isocyanate group content: 18.7%, uretdione group content: 12.1%, isocyanurate group content: 19.2% dimer/trimer ("D/T")=0.6) and 335 parts of polybutylene adipate diol (PBA-1000) having a molecular weight of 1,000. The mixture was allowed to react at 80° C. With progress of the reaction, the mixture became viscous, but was kept in a liquid state. After 5 hours, the urethane-forming reaction was completed with the FT-IR absorption peak of the isocyanate group having disappeared and the FT-IR absorption peaks of the isocyanurate group and the uretdione group being kept unchanged from the start of the reaction.

The reaction product, a polyurethane precursor, did not contain detectable free polyisocyanate monomer, having a hydroxyl value of 29.0, being in a solid wax state at an ordinary temperature, and having a viscosity of 50,000 (cP/100° C.) as measured by a B-type viscometer at 100° C. The uretdione group content of the polyurethane precursor determined by reaction with DBA in PGM-Ac at its boiling point and subsequent back titration with aqueous hydrochloric acid was 2.80%.

SYNTHESIS EXAMPLE 2

In a reactor equipped with a stirrer, a thermometer, and a cooler, there were placed 100 parts of polyisocyanate B (isocyanate group content: 14.8%, uretdione group content: 21.3%, isocyanurate group content: 11.9% D/T=1.8) and 176 parts of 3-methyl-1,5-pentane adipate diol (PMPDA-500) having a molecular weight of 500. The mixture was allowed to react at 80° C. With progress of the reaction, the mixture became viscous, but was kept in a liquid state. After 5 hours, the urethane-forming reaction was completed with the FT-IR absorption peak of the isocyanate group having disappeared and the FT-IR absorption peaks of the isocyanurate group and the uretdione group being kept unchanged from the start of the reaction.

The reaction product, a polyurethane precursor, did not contain detectable free polyisocyanate monomer, having a hydroxyl value of 71.7, being in a viscous liquid state at an ordinary temperature, having a viscosity of 20,000 (cP/100° C.) as measured by a B-type viscometer at 100° C., and having a uretdione group content of 7.72%.

SYNTHESIS EXAMPLE 3

In a reactor equipped with a stirrer, a thermometer, and a cooler, there were placed 100 parts of polyisocyanate C (isocyanate group content: 21.6%, uretdione group content: 16.9%, isocyanurate group content: 8.4% D/T=2.0, urethane group content: 1.6%) and 193 parts of 3-methyl-1,5-pentane adipate diol (PMPDA-500) having a molecular weight of 500. The mixture was allowed to react at 80° C. With progress of the reaction, the mixture became viscous, but was kept in a liquid state. After 5 hours, the urethane-forming reaction was completed with the FT-IR absorption peak of the isocyanate group only having disappeared and the FT-IR absorption peaks of the isocyanurate group and the uretdione group being kept unchanged from the start of the reaction. Thereto 6.4 parts of TMP was added and stirred to form a uniform solution.

The reaction product did not contain detectable free polyisocyanate monomer, having a hydroxyl value of 75.1, being in a viscous liquid state at an ordinary temperature, having a viscosity of 20,000 (cP/100° C.) as measured by a B-type viscometer at 100° C., and having a uretdione group content of 5.62%.

SYNTHESIS EXAMPLE 4

In a reactor equipped with a stirrer, a thermometer, and a cooler, there were placed 100 parts of polyisocyanate C (isocyanate group content: 21.6%, uretdione group content: 16.9%, isocyanurate group content: 8.4% D/T=2.0, urethane group content: 1.6%) and 16.1 parts of MDI (Millionate ® MT, made by Nippon Polyurethane Industry Co., Ltd.), and thereto was added 487.0 parts of 3-methyl-1,5-pentane adipate diol (PMPDA-1000) having a molecular weight of 1,000. The mixture was allowed to react at 80° C. With progress of the reaction, the mixture became viscous, but was kept in a liquid state. After 5 hours, the urethane-forming reaction was completed with the FT-IR absorption peak of the isocyanate group having disappeared and the FT-IR absorption peaks of the isocyanurate group and the uretdione group being kept unchanged from the start of the reaction. Thereto 3.0 parts of TMP was added and stirred to form a uniform solution.

The reaction product did not contain detectable free polyisocyanate monomer, having a hydroxyl value of 36.8, being in a viscous liquid state at an ordinary temperature, having a viscosity of 50,000 (cP/100° C.) as measured by a B-type viscometer at 100° C., and having a uretdione group content of 2.78%.

SYNTHESIS EXAMPLE 5

In a reactor equipped with a stirrer, a thermometer, and a cooler, there were placed 100 parts of polyisocyanate A (isocyanate group content: 18.7%, uretdione group content: 12.1%, isocyanurate group content: 19.2% D/T=0.6) and 334 parts of an aromatic polyester diol (1,6-HG)/(AA/TP/IP=1/1/1) having a molecular weight of 1,000. The mixture was allowed to react at 80° C. With progress of the reaction, the mixture became viscous, but was kept in a liquid state. After 5 hours, the urethane-forming reaction was completed with the FT-IR absorption peak of the isocyanate group having disappeared and the FT-IR absorption peaks of the isocyanurate group and the uretdione group being kept unchanged from the start of the reaction. Thereto 4.7 parts of Quadrol [N,N,N',N'-tetrakis(2-hydroxypropyl)ethylenediamine] (made by Asahi Denka Kogyo K. K.) was added and stirred to form a uniform solution.

The reaction product did not contain detectable free polyisocyanate monomer, having a hydroxyl value of 36.7, being in a viscous liquid state at an ordinary temperature, having a viscosity of 80,000 (cP/100° C.) as measured by a B-type viscometer at 100° C., and having a uretdione group content of 2.76%.

COMPARATIVE SYNTHESIS EXAMPLE 1 (TWO-COMPONENT TYPE-1)

An isocyanate-terminated prepolymer (isocyanate group content: 5.4%) having no uretdione group was synthesized in the same manner as in Example Synthesis 3 by using TDI (Coronate ® T-80, made by Nippon Polyurethane Industry Co., Ltd.; isocyanate group content:48.1, solid content: 100%) in place of polyisocyanate C, and 193 parts of 3-methyl-1,5-pentane adipate diol (PMPDA-500) having a molecular weight of 500, and reacting the mixture at 80° C. for 3 hours.

Immediately before use as an adhesive, 16.9 parts of TMP which was equivalent to the isocyanate group was added to the synthesized product. This is a comparative synthesis example for comparison with Synthesis Example 3.

COMPARATIVE SYNTHESIS EXAMPLE 2 (TWO-COMPONENT TYPE-2)

1,572 Parts of a mixed solvent of toluene/MEK (1/1) was added to a mixture of 500 parts of 3-methyl-1,5-pentane adipate diol (PMPDA-500) having a molecular weight of 500 used in Synthesis Example 3 and 174 parts of TDI (Coronate ® T-80, made by Nippon Polyurethane Industry Co., Ltd.: isocyanate group content: 48.1%, solid content: 100%). The resulting mixture was allowed to react at 80° C. for 7 hours, whereby a polymerized polyurethane resin solution was prepared.

The formed resin had a molecular weight of 30,000 by GPC measurement, a solid content of 30%, and a viscosity of 5,000 cP/25° C.

Immediately before use as an adhesive, 10 part in terms of solid content of Coronate ® L (made by Nippon Polyurethane Industry Co., Ltd.; solid content 75%, isocyanate group content: 13%) was added thereto as a polyisocyanate hardener to obtain a two-component type adhesive of Comparative Synthesis Example.

COMPARATIVE SYNTHESIS EXAMPLE 3 (BLOCKED ISOCYANATE)

To 300 parts of an isocyanate-terminated prepolymer (isocyanate content: 5.4%) prepared from the same starting material composition as in Comparative Synthesis Example 1, 33.6 parts of methyl ethyl ketone oxime was added as a blocking agent, and the mixture was allowed to react at 90° C. for 3 hours to prepare a blocked isocyanate. Thereto, 96.4 parts of 3-methyl-1,5-pentane adipate diol (PMPDA-500) having a molecular weight of 500, which is equivalent to the blocked isocyanate groups to obtain an adhesive for comparison with Synthesis Example 3.

[Preparation of Adhesive]

EXAMPLE 1 TO 5 AND COMPARATIVE EXAMPLE 1 TO 3

To each 100 parts of the synthesized products of Synthesis Examples 1 to 5 and Comparative Synthesis Examples 1 to 3 to be used as the main components of an adhesive, 0.5 parts of Irganox ®-1010 as the antioxidant was incorporated, and the blended matter was diluted with a mixed solvent of toluene/MEK (1/1) to prepare an adhesive having a solid content of 71.4%. The formulations and the results of evaluation of the performance are shown in Tables 1 and 2.

EXAMPLE 6

To 100 parts of the synthesized products of Synthesis Examples 1 to be used as the main components of an adhesive, 0.5 parts of Irganox ®-1010 as the antioxidant, Escalon ®-800 as the filler, and DOP as the plasticizer were incorporated to form an adhesive. The formulation and the results of evaluation of the performance are shown in Table 3.

EXAMPLE 7

To 100 parts of the synthesized products of Synthesis Examples 1 to be used as the main components of an adhesive, 0.5 parts of Irganox ®-1010 as the antioxidant, and DOP as the plasticizer were incorporated to form an adhesive. The formulation and the results of evaluation of the performance are shown in Table 3.

EXAMPLE 8

To 100 parts of the synthesized products of Synthesis Examples 3 to be used as the main components of an adhesive, 0.5 parts of Irganox ®-1010 as the antioxidant was incorporated to form an adhesive. The formulation and the results of evaluation of the performance are shown in Table 3.

[Performance Evaluation]

Steel plate/steel plate or steel plate/PET film were bonded by applying the adhesive in an amount of 50 g/m$^2$ on one of the steel plate.

In bonding of a steel plate with another steel plate, the solvent of the applied adhesive was removed by evaporation at 100° C., then a second steel plate was brought into contact therewith, and the combined steel plates were kept at 180° C. for 20 minutes and left standing at room temperature for 3 days.

In bonding of a steel plate with a PET film, the adhesive was applied on the surface of the steel plate in an amount of 50 g/m$^2$, and the solvent was removed by evaporation at 100° C. Then, the steel plate was heated at 180° C. for 5 minutes in an oven, and immediately thereafter, a PET film was laminated thereon and left standing at room temperature for 3 days.

(1) Stability of Formulated Adhesive

The stability of the formulated adhesives was evaluated from the increase of the viscosity at room temperature (25° C.) and 50° C. with lapse of time on the basis of the evaluation standard below;

<Evaluation Standard>

Gelation occurring within one day: x
Gelation occurring for 1 to 3 days: Δ
Viscosity rising by 10% or less after 7 days: O
Stable for 21 days or more: ⊙

(2) Measurement of Working Environment

The free polyisocyanate monomer in the working environment was detected by GC measurement of the sample taken from the atmosphere in the adhesive-formulating step (25° C.) and the drying step (180° C.).

(3) Coating Properties and Coating Appearance

The coating properties were evaluated during application, and the appearance (foaming or non-foaming) of the coating film was evaluated immediately after drying on the basis of the evaluation standard below:

<Evaluation Standard>

Excellent ⊙>O>Δ>x Poor (4) Initial Adhesiveness

The initial adhesiveness was evaluated by measuring the tensile shear strength immediately after the bonding under the aforementioned conditions.

(5) Shear Strength, Heat-Resistance, and Water-Resistance

The shear strength, the heat resistance, and the water resistance of the bonded matter was measured with a completely cured sample after the standing at room temperature. The shear strength was evaluated by tensile shearing test. The heat-resistance was evaluated by the heating bonding test (° C.) under a load of 1 kg for 25 mm breadth. The water resistance was evaluated from the retention ratio (%) of the bonding strength of the bonded sample after kept standing in water at 80° C. for 3 hours.

<Evaluation Standard for Heat-Resistance and Water-resistance>

Excellent >O>Δ>x Poor

The one-component type polyurethane of the present invention, as described above, has the strong adhesiveness, which is an advantage of conventional two-component type polyurethane adhesives, as well as satisfactory easy in using, long pot life, and storage stability, which are advantages of blocked isocyanate type adhesives. The adhesive of the present invention has semipermanent storage stability and pot life since it is of a one-component type. This adhesive is cured on heating up to the ring-opening temperature of the uretdione group by reaction with an active hydrogen group to give excellent heat-resistance and excellent durability. By suitable selection of the skeleton structure and the active hydrogen compound, the adhesive of the present invention is capable of exhibiting strong adhesiveness and excellent film characteristics on various base material. Moreover, the adhesive of the present invention in ordinary temperature does not contain a free polyisocyanate monomer which causes environmental problems, and it does not generate a free polyisocyanate monomer even at coating process at a high temperature, unlike some blocked isocyanate. Therefore, the adhesive of the present invention is handleable safely without aggravation of working environment.

TABLE 1

|  | Example 1 | Example 2 | Example 3 | Example 4 | Example 5 |
|---|---|---|---|---|---|
| Formulation Ratio of Adhesive | | | | | |
| Main component (parts) | Synthesis Example 1 100 | Synthesis Example 2 100 | Synthesis Example 3 100 | Synthesis Example 4 100 | Synthesis Example 5 100 |
| Antioxidant (parts) | 0.5 | 0.5 | 0.5 | 0.5 | 0.5 |
| Solvent (toluene/MEK) (parts) | 40 | 40 | 40 | 40 | 40 |
| Performance of Adhesive | | | | | |
| Viscosity (cP/25° C.) | 500 | 450 | 300 | 600 | 850 |
| Stability | | | | | |
| (25° C.) | ⊚ | ⊚ | ⊚ | ⊚ | ⊚ |
| (50° C.) | ⊚ | ⊚ | ⊚ | ⊚ | ○ |
| Detection of free polyisocyanate monomer (25° C.) | not | not | not | not | not |
| Coating properties | ⊚ | ○ | ⊚ | ⊚ | ○ |
| Appearance (foaming or non-foaming) | ⊚ | ⊚ | ⊚ | ⊚ | ⊚ |
| Detection of free polyisocyanate monomer (180° C.) | not | not | not | not | not |
| Initial adhesiveness[1] (kgf/cm$^2$) | 40, 4 | 15, 3 | 55, 6 | 35, 8 | 75, 7 |
| Shear strength[1] (kgf/cm$^2$) | 250, 20* | 280, 21* | 290, 18* | 240, 19* | 288, 21* |
| Heat-resistance | ⊚ | ⊚ | ○ | ⊚ | ⊚ |
| Water-resistance | ⊚ | ⊚ | ⊚ | ⊚ | ⊚ |

Note:
[1] Left values for steel/steel, right values for steel/PET,
*PET broken

TABLE 2

|  | Comparative Example 1 | Comparative Example 2 | Comparative Example 3 |
|---|---|---|---|
| Formulation Ratio of Adhesive | | | |
| Main component (parts) | Comparative Synthesis Example 1 100 | Comparative Synthesis Example 2 100 | Comparative Synthesis Example 3 100 |
| Antioxidant (parts) | 0.5 | 0.5 | 0.5 |
| Solvent (toluene/MEK) (parts) | 40 | 40 | 40 |
| Performance of Adhesive | | | |
| Viscosity (cP/25° C.) | 80 | 3,400 | 230 |
| Stability | | | |
| (25° C.) | X | Δ | ⊚ |
| (50° C.) | X | X | ○ |
| Detection of free polyisocyanate monomer (25° C.) | 0.05 ppm | not | not |
| Coating properties | Δ | ⊚ | ⊚ |
| Appearance (foaming or non-foaming) | Δ | ○ | X |
| Detection of free polyisocyantate monomer (180° C.) | 0.18 ppm | not | 0.02 ppm |
| Initial adhesiveness[1] (kgf/cm$^2$) | 45, 5 | 65, 9 | 15, 2 |
| Shear strength[1] (kgf/cm$^2$) | 295, 22* | 180, 19* | 140, 13* |
| Heat-resistance | ⊚ | Δ | X |
| Water-resistance | ⊚ | Δ | Δ |

Note:
[1] Left values for steel/steel, right values for steel/PET,
*PET broken

TABLE 3

|  | Example 6 | Example 7 | Example 8 |
|---|---|---|---|
| Formulation Ratio of Adhesive | | | |
| Main component (parts) | Synthesis Example 1 100 | Synthesis Example 1 100 | Synthesis Example 3 100 |
| Antioxidant (parts) | 0.5 | 0.5 | 0.5 |
| Filler (parts) | 20 | — | — |
| Plasticizer (parts) | 20 | 10 | — |
| Performance of Adhesive | | | |
| Viscosity (cP/25° C.) | >1,000,000 | 5,000 | wax-like |
| Stability | | | |
| (25° C.) | ⊚ | ⊚ | ⊚ |
| (50° C.) | ⊚ | ⊚ | ⊚ |
| Detection of free polyisocyanate monomer (25° C.) | not | not | not |
| Coating properties | ○ | ⊚ | ○ |
| Appearance (foaming or non-foaming) | ⊚ | ⊚ | ⊚ |
| Detection of free polyisocyanate monomer (180° C.) | not | not | not |

TABLE 3-continued

| | Example 6 | Example 7 | Example 8 |
|---|---|---|---|
| Initial adhesiveness[1] (kgf/cm$^2$) | 105, 2 | 64, 3 | 86, 9 |
| Shear strength[1] (kgf/cm$^2$) | 300, 19* | 275, 13* | 310, 23* |
| Heat-resistance | ⊚ | ○ | ⊚ |
| Water-resistance | ⊚ | ⊚ | ⊚ |

Note:
[1]Left values for steel/steel, right values for steel/PET,
*PET broken

What is claimed is:

1. A one-component polyurethane adhesive comprising, as a main component, a polyurethane precursor prepared by reaction of a polyisocyanate component (a) comprising at least one polyisocyanate compound (a-1) with an active hydrogen compound selected from the group consisting of water and a compound having a molecular weight of less than 20,000 and having two or more active hydrogen groups, at an equivalent ratio of the active hydrogen group of the active hydrogen compound to the isocyanate group of the polyisocyanate component (a) of more than 1.0; the polyurethane precursor containing a uretdione group and the active hydrogen group at an equivalent ratio of the uretdione group to the active hydrogen groups of from 0.25 to 1.0, where (a-1) is a polyisocyanate compound having at least a uretdione group and an isocyanurate group and is formed from hexamethylene diisocyanate or polymeric forms of hexamethylene diisocyanate.

2. A one-component polyurethane adhesive according to claim 1, wherein the polyisocyanate compound (a-1) comprises a uretdione group, an isocyanurate group, and further groups, other than uretdione and isocyanurate groups, derived from an isocyanate group.

3. The one-component polyurethane adhesive of claim 1 where the polyisocyanate component (a) further comprises at least one additional polyisocyanate (a-2) having at least two isocyanate groups.

4. The one-component polyurethane adhesive according to claim 2 wherein the further groups comprising the polyisocyanate compound (a-1) are selected from the group consisting of a urethane group, carbodiimide group, uretoneimine group, oxazolidone group and a hydantoin group.

5. The one-component polyurethane adhesive according to claim 3 wherein the polyisocyanate (a-2) is formed from polyisocyanate monomer selected from the group consisting of 2,4-tolylene diisocyanate, 4,4'-diphenylmethane diisocyanate, hexamethylene diisocyanate, polymeric forms of 2,4-tolylene diisocyanate, polymeric forms of 4,4'-diphenylmethane diisocyanate, and polymeric forms of hexamethylene diisocyanate.

6. The one-component polyurethane adhesive of claim 1, further comprising another active hydrogen compound having two or more active hydrogen groups in the molecule in such an amount that the equivalent ratio of the uretdione group to the total of the active hydrogen groups of the polyurethane precursor and the active hydrogen groups of the additionally contained active hydrogen compound is in the range of from 0.25 to 1.0.

7. The one-component polyurethane adhesive according to claim 1 wherein the active hydrogen compound is selected from the group consisting of polyols, urea resins, melamine resins, epoxy resins, polyester resins, acrylic resins and polyvinyl resins.

8. The one-component polyurethane adhesive according to claim 7 wherein the polyols have a functionality of 2 to prevent gelation in the polyurethane precursor.

9. A one-component polyurethane adhesive comprising, as a main component, a polyurethane precursor prepared by reaction of a polyisocyanate component (a) comprising a first polyisocyanate and a second polyisocyanate with an active hydrogen compound (b) at an equivalent ratio of the active hydrogen group of the active hydrogen compound component (b) to the isocyanate group of the polyisocyanate component (a) of more than 1.0; the polyurethane precursor containing a uretdione group and the active hydrogen group at an equivalent ratio of the uretdione group to the active hydrogen groups of from 0.25 to 1.0, where the first polyisocyanate has at least a uretdione group and an isocyanurate group and is formed from hexamethylene diisocyanate or polymeric forms of hexamethylene diisocyanate and the second polyisocyanate has at least two isocyanate groups; and further where the one-component type polyurethane adhesive has neither a free polysocyanate monomer or a free isocyanate group at 25° C.

10. A method of use of the one-component adhesive according to claim 1 comprising applying the one-component adhesive to an adherend at a temperature below the ring-opening temperature of the uretdione group and then heating the one-component adhesive above the ring-opening temperature.

11. A method of use of the one-component adhesive according to claim 1 comprising heating the one-component adhesive above the ring-opening temperature of the uretdione group and then applying the one-component adhesive to an adherend.

12. A method of use of the one-component adhesive according to claim 2 comprising applying the one-component adhesive to an adherend at a temperature below the ring-opening temperature of the uretdione group and then heating the one-component adhesive above the ring-opening temperature.

13. A method of use of the one-component adhesive according to claim 2 comprising heating the one-component adhesive above the ring-opening temperature of the uretdione group and then applying the one-component adhesive to an adherend.

14. A method of use of the one-component adhesive of claim 3 comprising applying the one-component adhesive to an adherend at a temperature below the ring-opening temperature of the uretdione group and then heating the one-component adhesive above the ring-opening temperature.

15. A method of use of the one-component adhesive of claim 3 comprising heating the one-component adhesive above the ring-opening temperature of the uretdione group and then applying the one-component adhesive to an adherend.

16. The one-component adhesive according to claim 1 which includes a plasticizer.

17. The one-component adhesive according to claim 16 which includes a filler.

18. The one-component adhesive according to claim 17 which includes an antioxidant.

* * * * *